United States Patent
Neal

[11] 3,851,390
[45] Dec. 3, 1974

[54] TRIMMING ATTACHMENT

[76] Inventor: Albert D. Neal, 17272 Blue Fox Cir., Huntington Beach, Calif. 92647

[22] Filed: Jan. 21, 1974

[21] Appl. No.: 435,325

[52] U.S. Cl. .................................. 30/276, 56/295
[51] Int. Cl. ..................... B26b 25/00, A01d 55/18
[58] Field of Search ............ 30/240, 228, 238, 264, 30/276, 293, 273, 206, 500; 56/17.6, 17.5, 296, 295

[56] References Cited
UNITED STATES PATENTS

| | | | |
|---|---|---|---|
| 2,458,200 | 1/1949 | Renfroe et al. | 56/17.6 |
| 2,683,310 | 7/1954 | Majeski | 30/264 |
| 2,684,532 | 7/1954 | Sumstad | 30/276 |
| 2,787,265 | 4/1957 | Neidt | 30/276 |
| 2,867,040 | 1/1959 | Mertesdorf | 30/240 |
| 2,982,320 | 5/1961 | Trumbull et al. | 30/293 |
| 3,017,733 | 1/1962 | Evans | 56/17.5 |
| 3,781,991 | 1/1974 | Stretton | 30/276 |
| 3,788,050 | 1/1974 | Houst | 56/295 |

FOREIGN PATENTS OR APPLICATIONS

| | | | |
|---|---|---|---|
| 1,118,247 | 6/1968 | Great Britain | 30/276 |

*Primary Examiner*—Al Lawrence Smith
*Assistant Examiner*—Roscoe V. Parker
*Attorney, Agent, or Firm*—George F. Smyth

[57] ABSTRACT

A trimming attachment for use with a power operated drill which includes a restrained blade having a plurality of teeth, an outer support surface on the restrained blade and means for fixing the rotational position of the restrained blade with respect to a power operated drill. A rotatable blade having an inner surface which is complementary to the outer support surface of the restrained blade is positioned with the inner surface in sliding engagement with the outer support surface. Drive means connectable to the output shaft of a power operated drill are connected to the rotatable blade through connecting means which transmit rotational movement from the drive means to the rotatable blade while permitting rocking movement of the rotatable blade such that the inner surface of the rotatable blade remains in slidable engagement with the outer support surface. Material which is to be cut extends through the teeth on the restrained blade and is held by the teeth while being contacted and severed by the rotatable blade.

The rotatable blade may have a triangular configuration to define three cutting edges which coact with the teeth on the restrained blade in cutting material which extends through the teeth. Also, the blade may include a peripheral edge with the teeth on the restrained blade extending inwardly from the peripheral edge and the rotatable blade positioned in overlying relation to the teeth and terminating at points which are spaced inwardly from the peripheral edge of the blade.

12 Claims, 7 Drawing Figures

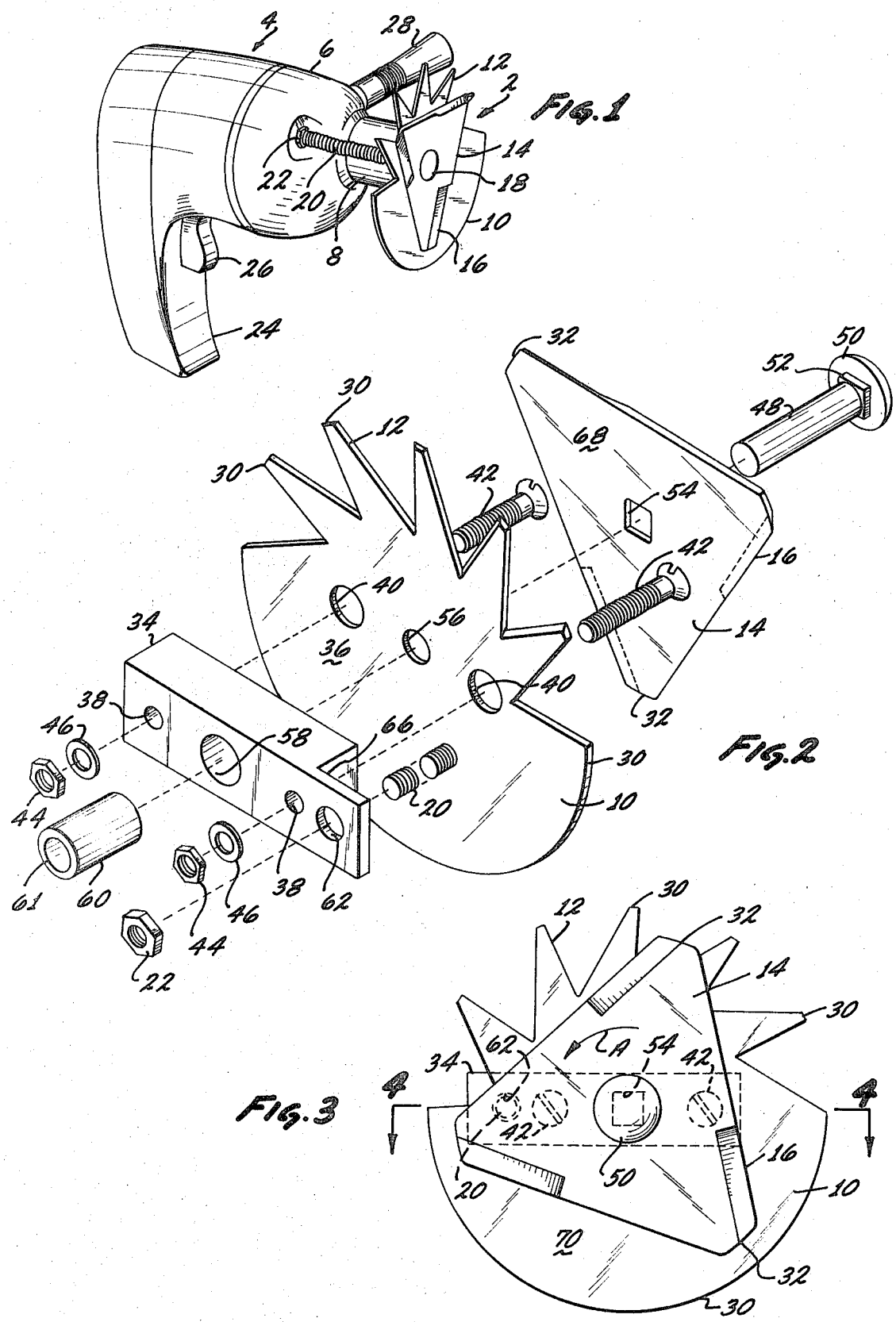

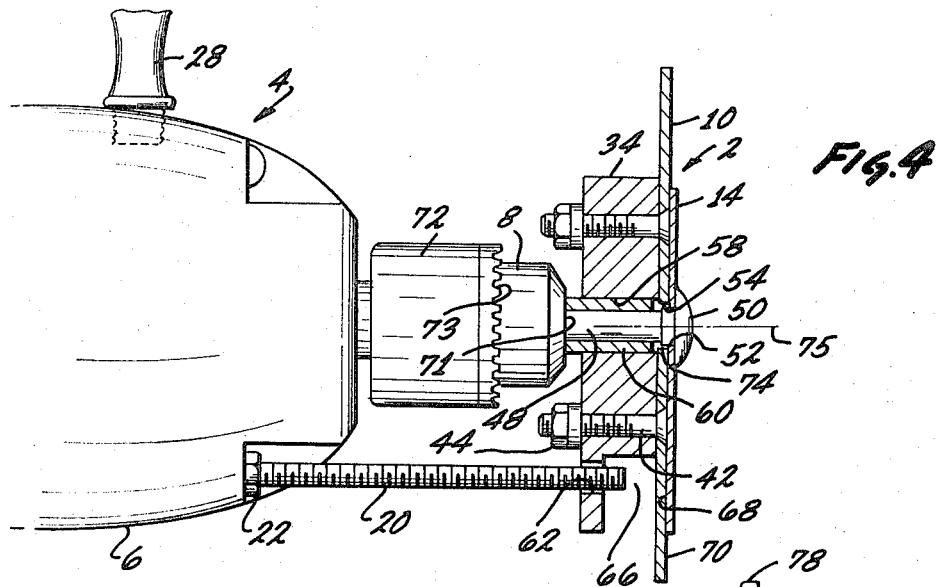
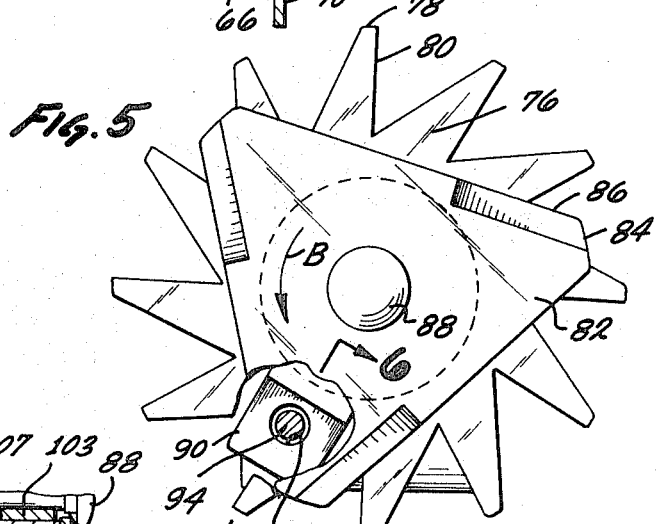
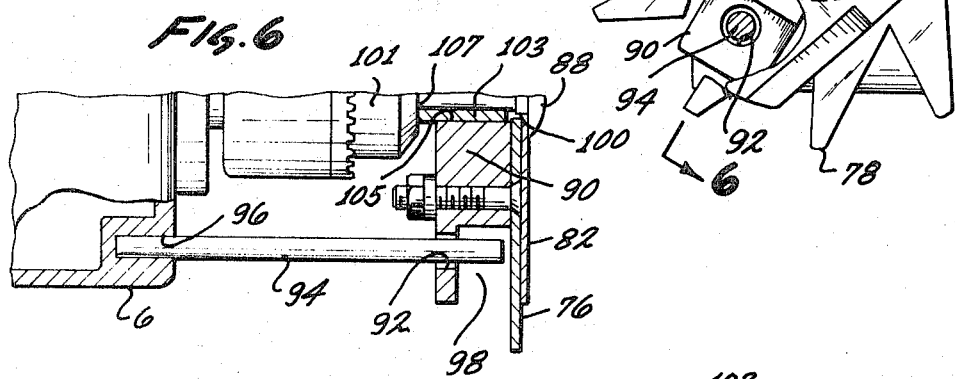
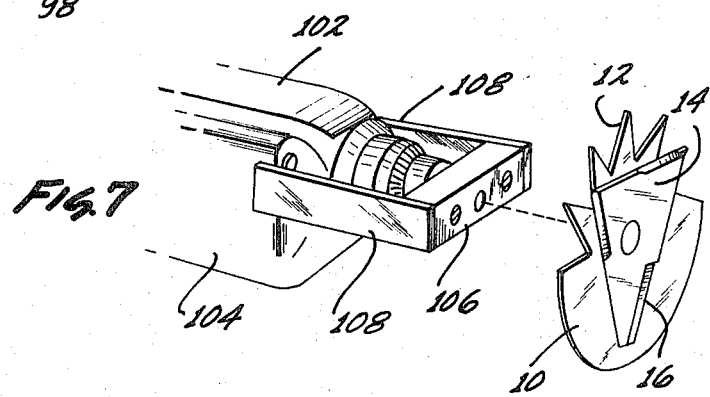

TRIMMING ATTACHMENT

BACKGROUND OF THE INVENTION

During recent years, there has been a proliferation in the number of specialized power operated tools for performing various tasks around the home. Most homeowners cannot afford the expense of owning all the various power operated tools and this, in turn, has led to the widespread practice of renting specialized tools from companies which rent tools to homeowners.

The renting of tools is not altogether a satisfactory solution since the needed power operated tool may not be available from the rental company when it is most needed. Moreover, it would be inconvenient and unduly expensive to rent a tool which is needed on a regular basis, such as, for example, a power operated lawn mower.

As a solution to the above problem, various attachments are now available for use with standard power operated tools such as a power operated drill. In this regard, reference is made to the following United States patents which deal with attachments of various types for power operated drills:

| | |
|---|---|
| Renfroe | U.S. 2,458,200 |
| Evans | U.S. 3,017,733 |
| Mertesdorf | U.S. 2,867,040 |
| Sumstad | U.S. 2,684,532 |
| Neidt | U.S. 2,787,265 |
| Trumbull | U.S. 2,982,320 |
| Grieder | U.S. 2,629,220 |

In the care of the home, there is a recurring need for a power operated attachment that could be used in trimming shrubs or in trimming tall grass around a yard enclosure. Grass or shrubs which need to be trimmed may grow in an area that is in close proximity to an upstanding surface such as a wall. Thus, the attachment should be capable of cutting in an area that is immediately adjacent to an upstanding surface without the possibility of damage to the attachment through its contact with the wall surface. Moreover, such an attachment should be relatively simple in construction so that it can be kept in good operating order with a minimum of upkeep by the homeowner.

From a review of the various patents cited above, I am aware of power operated attachments for use with a power operated drill in which a blade is rotated by a drill with respect to a fixed guard having a plurality of teeth that is positioned in spaced relation with respect to the movable blade. A disadvantage of such attachments is that they are difficult to maintain in satisfactory working order since the fixed guard may become bent so that it is not properly aligned with the rotatable blade. In this instance, the rotatable blade may contact the guard during usage of the attachment with consequent damage to the rotatable blade and guard.

Moreover, in the use of such attachments, the cutting action provided between a rotatable blade and a fixed guard may not be satisfactory since there is not sufficient coaction between the cutting edges of the rotatable blade and the teeth of the guard. A further drawback of such devices is that the cutting edges of the rotatable blade may become dulled after a short period of use and require constant sharpening to maintain the attachment in satisfactory operating order. A still further disadvantage of certain power attachments is that their size and bulk makes them heavy and cumbersome so that they cannot be used in cutting material that is situated in a difficult location such as an area that is located beneath overhanging branches or an area that is located immediately adjacent to an upstanding surface such as a wall.

It would, therefore, be desirable to have a trimming attachment for a power operated drill that could be more easily used by the average homeowner and which could be easily maintained in satisfactory operating condition with a minimum of effort. Also, it would be desirable to have a trimming attachment of relatively light weight such that it could be moved easily from place to place and could be used in trimming material in difficult areas adjacent to a wall surface or in an area that is located beneath overhanging branches.

SUMMARY OF THE INVENTION

In providing a solution to the aforementioned problems, the present invention concerns a trimming attachment for a power operated drill which may be light in weight and may be easily maintained in satisfactory operating condition by the homeowner with a minimum of effort. The present attachment employs a restrained blade having a plurality of teeth with an outer support surface on the restrained blade. Means may be used in fixed the rotational position of the blade with respect to a power operated drill. A rotatable blade having an inner surface which is complementary to the outer support surface of the restrained blade is positioned with the inner surface in sliding engagement with the outer support surface. This brings the cutting edges of the rotatable blade into close sliding proximity with the teeth on the restrained blade. Thus, movement of the rotatable blade with respect to the restrained blade produces better coaction between the cutting edges of the rotatable blade and the teeth on the restrained blade and also some degree of self-sharpening of said cutting edges and teeth.

In positioning the rotatable blade with respect to the restrained blade, drive means which are connectable to the output shaft of a power operated drill are connected to the rotatable blade through connecting means. The connecting means transmit rotational movement from the drive means to the rotatable blade while permitting roacking movement of the rotatable blade with respect to its axis of rotation. In this manner, the inner surface of the rotatable blade is maintained in slidable engagement with the outer support surface of the fixed blade. The rocking movement, thereby, provides self-alignment of the rotatable blade with respect to the restrained blade. This self-alignment of the rotatable blade maintains the attachment in satisfactory operating condition with a minimum of effort on the part of the user. With the rotatable blade, thus, in proper alignment with the restrained blade, material to be cut extends through the teeth on the restrained blade and is held by the teeth while being sheared by the cooperative action of the rotatable blade and the teeth of the restrained blade.

In the present attachment, the restrained blade may have a peripheral surface having a generally circular configuration. The teeth on the restrained blade may be positioned about the entirety of the peripheral surface or, conversely, about only a portion of the peripheral surface. Preferably, the rotatable blade has a triangular configuration so as to define three cutting edges which coact with the teeth on the restrained blade in cutting material which extends through and is held by the teeth.

For use in cutting material that is located in difficult areas, the restrained blade may include a peripheral edge with the teeth on the restrained blade extending inwardly from the peripheral edge. The rotatable blade may then be positioned in overlying relation to the teeth with the rotatable blade preferably terminating at points which are spaced inwardly from the peripheral edge of the restrained blade. In this manner, the attachment may be used in cutting adjacent to an upstanding surface by bringing the peripheral edge of the fixed blade adjacent or into contact with the surface while the material to be cut extends into and is held by the teeth on the restrained blade.

In the present trimming attachment, the inner surface of the restrained blade may be secured to a support member which is connected to a connecting member in fixing the position of the restrained blade with respect to rotation through connection to the housing of a power operated drill. The connecting means for securing the rotational position of the support member with respect to the housing of a power operated drill may be a rod which loosely engages an opening in the support member. Preferably, the rod or connecting member merely acts as a stop in preventing rotation of the restrained blade. It is preferably that the rod or connecting member not be rigidly connected to the restrained blade since a rigid connection would tend to transmit bending forces from the rod or connecting member to the restrained blade which would alter the plane of the restrained blade.

Also, in connecting the support member to the housing of a drill body restraint arms may be employed which are shaped and positioned to loosely contact the housing of a drill in restraining the rotational position of the support member and restrained blade with respect to the drill housing.

BRIEF DESCRIPTION OF THE DRAWINGS

In further describing a preferred embodiment of the invention, reference is made to the accompanying drawings in which:

FIG. 1 is a perspective view of a trimming attachment having a restrained blade and a rotatable blade driven by a power operated drill with the trimming attachment being positioned relative to the drill so that the rotational position of the restrained blade is fixed through a loose connection with the drill housing;

FIG. 2 is an exploded view of the trimming attachment of FIG. 1 illustrating the manner in which an inner surface of the restrained blade is secured to a support member while an inner surface of a triangular shaped rotatable blade is in sliding engagement with an outer support surface of the restrained blade;

FIG. 3 is an enlarged front view of the trimming attachment of FIG. 1 illustrating the movement of the rotatable blade with respect to the teeth of the restrained blade;

FIG. 4 is a sectional view taken along the line 4—4 of FIG. 3 and illustrating the positioning of the trimming attachment with respect to a drill chuck with the support member for the restrained blade being restrained with respect to a drill housing through a threaded support rod;

FIG. 5 is an enlarged front view, similar to FIG. 3, illustrating a different embodiment of the invention in which inwardly extending teeth are positioned about the entirety of the peripheral edge of the restrained blade;

FIG. 6 is a partial sectional view taken along the line 6—6 of FIG. 5 to illustrate positioning of the trimming attachment with respect to a drill chuck with the support member for the restrained blade being restrained with respect to a drill housing through an unthreaded rod, and FIG. 7 is a partial perspective view illustrating another embodiment of the invention in which the support member for the restrained blade is secured to a drill housing by restraining arms which are attached to the support member and are positioned to loosely restrain the drill housing.

DETAILED DESCRIPTION

FIG. 1 illustrates a trimming attachment generally designated 2 that is positioned on a power operated drill 4 having a housing 6 and a drill chuck 8. The trimming attachment 2 includes a restrained blade 10 having teeth 12 positioned about a portion of the blade. A rotatable blade 14 having a plurality of knife edges 16 is positioned on a stub shaft 18 which is driven through connection with the drill chuck 8.

To fix the rotational position of restrained blade 10 with respect to the housing 6, a threaded support rod 20 engaging the blade is threadedly engaged with an aperture in the drill housing and is held in place by a lock nut 32. With the blade 10 thus restrained with respect to rotational movement, the trimming attachment 2 functions through a cooperative action of the knife edges 16 with the teeth 12. The material to be cut extends through the teeth 12 and is held thereby while being severed through the cooperative action of the knife edges 16 with the teeth.

The power operated drill 4 may be of any standard construction. Thus, for example, the drill 4 may include a pistol grip 24 and also a trigger 26 for actuation of the drill motor (not shown). Further, the drill 4 may include a handle such as the handle 28 to steady the position of the drill while it is being used.

The trimming attachment 2 is shown in exploded view in FIG. 2 to illustrate in more detail the various parts of the attachment and the manner in which they cooperate. The restrained blade 10, which may have a generally circular configuration, is defined by a peripheral edge 30 with the teeth 12 extending inwardly from a portion of the peripheral edge. The rotatable blade 14, which may have a triangular shape, may terminate at extremities 32 which are positioned inwardly from the peripheral edge 30. A support member 34 may be secured to an inner surface 36 of the restrained blade 10 through apertures 38 in the support member and apertures of a larger size 40 in the blade. Flat head screws, such as the screws 42, may then extend through the apertures 38 and 40 and be retained therein by nuts 44 which threadedly engage the screws with washers 46 placed between the nuts and the surface of support member 34.

A stub shaft 48 having an enlarged head 50 which holds the rotatable blade 14 against restrained blade 10 and a square connector 52 may extend through a square opening 54 positioned centrally of the rotatable blade. In securing the rotatable blade 14 against the restrained blade 10, the stub shaft 48 may extend through a central aperture 56 in restrained blade 10. An enlarged aperture 58 in support member 34 supports a bearing sleeve 60 with the stub shaft 48, thus, being positioned within the bearing sleeve. The bearing sleeve 60 may be press fitted within aperture 58 with an end surface 61 of the sleeve in contact with the end surface of the drill chuck. In this manner, the fixed blade 10 floats on the end surface of the drill chuck through the bearing sleeve 60.

An aperture 62 in the support member 34 surrounds the threaded support rod 20 and a recess 66 in the support member 34 permits spacing the outer end of the rod away from the inner surface 36 of restrained blade 10. With the trimming attachment 2 in assembled form, an inner surface 68 on the rotatable blade 14 bears against an outer support surface 70 on the restrained blade 10 (see FIG. 3). The teeth 12 of the fixed blade 10, as illustrated, are preferably positioned along radii from the center of the fixed blade. The inner surface 68 has a configuration which is complementary to that of the outer support surface 70 with the inner surface in slidable engagement with the outer surface. With rotatable blade 14 positioned against the restrained blade 10 and, thus, supported by contact with the fixed blade, the rotatable blade may be positioned in overlying relation to the teeth 12 with the extremities 32 of the rotatable blade terminating at points which are spaced inwardly from the peripheral edge 30 of the restrained blade 10. Material which is to be cut extends between the teeth 12 and is held thereby while rotation of the rotatable blade 14 in the direction of the arrow designated A cuts the material through the cooperative action of the knife edges 16 and the teeth.

FIG. 4, which is a sectional view taken along line 4—4 of FIG. 3, illustrates the manner in which the trimming attachment 2 may be secured to the housing 6 of power operated drill 4. As indicated, the heads of the screws 42 are positioned flush with the outer surface 70 of the fixed blade 10 to not interfere with the sliding engagement of the outer surface with the inner surface 68 of rotatable blade 14. The power operated drill 4 may include a chuck adjustment sleeve of standard construction such as adjusted sleeve 72 to open and close the chuck 8. Additionally, a surface of the adjustment sleeve 72 may be grooved in a conventional manner as at 73 to permit the use of a hand tool in rotating the adjustment sleeve to open or close the chuck 8. An end surface 71 of the chuck 8 engages the end surface of the bearing sleeve 60 which is press fitted within aperture 58 in the support member 34. The support member 34 and restrained blade 10 are, thus, floatable supported through contact of the bearing sleeve 60 with the end surface 71.

As described previously, the stub shaft 48 may be connected to the rotatable blade 14 through connecting means such as the square connector 52 which engages the square opening 54 in the rotatable blade. On rotation of stub shaft 48, rotational movement is, thereby, conveyed to the rotatable blade 14. As shown in FIG. 4, the square connector 52 is somewhat smaller in size than the square opening 54 to provide a gap 74 between the surface of the square connector and that of the square opening. The gap 74 provides a connecting means between the stub shaft 48 and rotatable blade 14 which permits a rocking motion of the rotatable blade 14 during its rotation with respect to an axis of rotation 75.

The rocking movement permitted the rotatable blade 14 provides self-alignment of the rotatable blade with the restrained blade 10 through contact of the outer support surface 70 of the restrained blade with the inner surface 68 of the rotatable blade. The self-alignment of the rotatable blade 14 with respect to the fixed blade 10 is of considerable importance since it provides for reliable support of the rotatable blade by the restrained blade. This support is provided even if the position of the restrained blade 10 is altered somewhat during extending usage of the attachment 2. Thus, if the angle between the outer support surface 70 and the axis of rotation 75 were altered in some manner, this would not prevent alignment of the restrained blade 10 with the rotatable blade 14 since the rotatable blade would self-align with the new position of the fixed blade.

In addition, by maintaining the rotatable blade 14 in constant sliding engagement with the restrained blade 10, the rotatable blade is supported more securely since its entire inner surface 68 is engaged by the outer support surface 70 of the restrained blade. Also, by maintaining rotatable blade 14 in sliding engagement with the restraining blade 10, the teeth 12 of the restrained blade are brought into close contact with the knife edges 16 on the rotatable blade (see FIG. 3). This permits better coaction between the teeth 12 and the knife edges 16 in cooperatively shearing material which extends through the teeth. Also, the close contact between the teeth 12 and the knife edges 16 provides some self-sharpening of the teeth and knife edges such that the surfaces will not become dulled as quickly during usage. As illustrated, the aperture 62 in support member 34 is considerably larger than the diameter of the rod 20. Thus, the rod 20 acts merely as a stop in fixing the rotational position of restrained blade 10. The loose fit between the aperture 62 and rod 20 permits bending of the rod without altering the plane of the restrained blade 10 and its floating support through contact of the end surface 71 with the bearing sleeve 60.

In a further embodiment of the invention as shown in front view of FIG. 5, a restrained blade 76 corresponding to the restrained blade 10 in FIGS. 1-4, has a peripheral edge 78 with a plurality of teeth 80 extending radially inwardly and being spaced uniformly about the entire peripheral edge. A rotatable blade 82, corresponding to the rotatable blade 14 in FIGS. 1-4, is mounted against the restrained blade 76 with the extremities 84 of the rotatable blade positioned at points that are spaced inwardly from the peripheral edge 78. The rotatable blade 82 may have a triangular configuration, as indicated, to define three knife edge surfaces 86 which cooperate with the teeth 80 in shearing material which extends between the teeth.

The rotatable blade 82 may be positioned on a stub shaft 88 which extends through the rotatable blade and the restrained blade 76 in the same manner as the stub shaft 48 described in FIGS. 1-4. Likewise, a support member 90 may be secured to the undersurface of the restrained blade 76 in the same manner as the support member 34 described previously, with the support member having an aperture 92 which loosely surrounds a support rod 94 to fix the rotational position of the support member with respect to the power operated drill. When supported as shown in FIG. 5, the rotatable blade 82 may be rotated in the direction of the arrow designated B to provide coaction between the knife edges 86 and the teeth 80 in shearing material which extends between the teeth.

FIG. 6, which is a sectional view taken along line 6—6 of FIG. 5, illustrates that the support rod 94 may be unthreaded and be retained within the drill housing 6 by extending into a blind hole 96 formed in the housing. A recess 98, similar to recess 66, may be formed in support member 90 with the end of the rod 94 retained loosely in an aperture 92 and extending into the recess without contacting the fixed blade 76 or movable blade 82. The connecting means between the stub shaft 88 and the movable blade 82 may include a gap 100 which functions in the same manner as the gap 74 described with regard to FIG. 5. Thus, gap 100 permits a rocking movement of the rotatable blade 82 during rotation about its axis of rotation. In this manner, the rotatable blade 82 is self-aligned and in engagement with the restrained blade 76.

A central aperture 105 in the support member 90 engages a bearing sleeve 103 which is press fitted within the aperture. As described previously with regard to sleeve 60, an end surface of sleeve 103 engages an end surface 107 of a chuck 101. In this manner, the restrained blade 76 is floatably supported by contact of the end surface 107 with the end surface of sleeve 103.

In a further embodiment shown in FIG. 7, a drill housing 102 having flattened sides 104 may be connected to a support member 106 through flexible restraining arms 108 which are connected to the support member and are in contact with the flattened sides 104. The restrained blade and movable blade of the trimming attachment illustrated in FIG. 7 have the same reference numerals that were used in describing the like elements in FIGS. 1-4. Also, of course, the restrained blade in the embodiment of FIG. 7 may have teeth positioned about its entire peripheral edge in the manner of the restrained blade 76 illustrated in FIGS. 5 and 6.

The embodiment of the trimming attachment illustrated in FIG. 7 is advantageous because it provides for easy connection or disconnection with the drill housing 102 through flexible restraining arms 108. Also, the use of two restraining arms 108 provides a two point connection for the support member 106. Any torque transmitted to support member 106 on rotation of the drill is opposed equally by the two arms 108 which tends to prevent twisting of the support member with respect to the drill housing 102. The restraining arms 108 loosely engage the sides 104 of housing 102. Thus, the arms 108 merely fix the rotational position of blade 10 which is floatingly supported through contact with an end surface of the chuck as described previously.

I claim:

1. A trimming attachment for use with a power operated drill, said trimming attachment comprising:
   a restrained blade having a plurality of teeth;
   an outer support surface on said restrained blade;
   means for fixing the rotational position of said restrained blade with respect to a power operated drill;
   a rotatable blade having an inner surface which is complementary to the outer support surface of said restrained blade;
   said rotatable blade positioned with said inner surface in sliding engagement with said outer support surface;
   drive means which are connectable with the output shaft of a power operated drill, and
   said drive means connected to said rotatable blade through connecting means which transmit rotational movement from said drive means to said rotatable blade while holding the rotatable blade against the restrained blade and permitting rocking movement of the rotatable blade such that the inner surface of the rotatable blade is slidably engaged with said outer support surface and supported by said outer support surface,
   whereby material to be cut extends through the teeth on the restrained blade and is held by the teeth while being contacted and severed by coaction between the rotatable blade and the teeth on the restrained blade.

2. The trimming attachment of claim 1 wherein
   said restrained blade has a peripheral surface having a generally circular configuration, and
   said teeth are positioned about a portion of said peripheral surface.

3. The trimming attachment of claim 1 wherein
   said restrained blade has a peripheral surface having a generally circular configuration, and
   said teeth are positioned about the entirety of said peripheral surface.

4. The trimming attachment of claim 1 wherein
   said rotatable blade has a triangular configuration to define three cutting edges which coact with said teeth in cutting material which extends through said teeth on the restrained blade.

5. The trimming attachment of claim 1 including
   a peripheral edge on said restrained blade with said teeth extending inwardly from said peripheral edge;
   said rotatable blade positioned in overlying relation to said teeth, and
   said rotatable blade terminating at points spaced inwardly from said peripheral edge,
   whereby said attachment may be used in cutting adjacent to a surface by bringing the peripheral edge adjacent or into contact with the surface with the material to be cut extending into and being held by said teeth.

6. The trimming attachment of claim 1 including
   an inner surface on said restrained blade;
   a support member secured to the inner surface of said restrained blade, and
   means to floatingly position said support member with respect to a power operated drill.

7. The trimming attachment of claim 1 including
   an aperture in said restrained blade, and
   said drive means extending through said aperture in connecting the rotatable blade to the output shaft of a power operated drill.

8. The trimming attachment of claim 7 including
   an inner surface on said restrained blade;
   a support member secured to the inner surface of said restrained blade;
   an opening in said support member in alignment with the aperture in said restrained blade, and
   a support member within said opening for supporting said support member in a floating relation with respect to a power operated drill.

9. The trimming attachment of claim 8 including
a support bearing positioned within said opening;
said drive means positioned within said support bearing, and
said support bearing in press fitting engagement with said support member.

10. The trimming attachment of claim 6 wherein said means to position said support member is a rod;

an opening in said support member, and
said rod in loose engagement with said opening in fixing the rotational position of said support means and said restrained blade with respect to a power operated drill.

11. The trimming attachment of claim 6 wherein said means to position the support member includes
restraining arms attached to said support member, and
said restraining arms being shaped and positioned to loosely contact the housing of a power operated drill in fixing the rotational position of said support member and said blade with respect to the drill.

12. The trimming attachment of claim 1 wherein said teeth are positioned axially with respect to the axis of rotation of said rotatable blade.

* * * * *